United States Patent [19]

Dalton, Jr. et al.

[11] 4,336,239
[45] Jun. 22, 1982

[54] SYNTHESIS OF HYDROGEN PEROXIDE

[75] Inventors: Augustine I. Dalton, Jr.; Ronald W. Skinner, both of Allentown, both of Pa.

[73] Assignee: Air Products and Chemicals, Inc., Allentown, Pa.

[21] Appl. No.: 219,402

[22] Filed: Dec. 22, 1980

Related U.S. Application Data

[63] Continuation-in-part of Ser. No. 195,827, Oct. 10, 1980.

[51] Int. Cl.³ .............................................. C01B 15/02
[52] U.S. Cl. .................................................... 423/584
[58] Field of Search ........................................ 423/584

[56] References Cited

U.S. PATENT DOCUMENTS

| 3,336,112 | 8/1967 | Hooper | 423/584 |
| 3,361,533 | 1/1968 | Hooper | 423/584 |
| 4,007,256 | 2/1977 | Kim et al. | 423/584 |
| 4,009,252 | 2/1977 | Izumi et al. | 423/584 |

FOREIGN PATENT DOCUMENTS

| 1490925 | 11/1977 | United Kingdom | 423/584 |
| 1546129 | 5/1979 | United Kingdom | 423/584 |

Primary Examiner—O. R. Vertiz
Assistant Examiner—Wayne A. Langel
Attorney, Agent, or Firm—James C. Simmons; E. Eugene Innis

[57] ABSTRACT

This invention relates to an improvement in hydrogen peroxide synthesis from hydrogen and oxygen, in an acidic medium containing an oxygenated or nitrogenous organic compound using a supported Group VIII noble metal catalyst. The improvement comprises using an oxygen/hydrogen ratio higher than about 3.4 and a catalyst level above 30 mg. per 100 ml. of medium.

12 Claims, 2 Drawing Figures

SYNTHESIS OF HYDROGEN PEROXIDE

REFERENCE TO RELATED APPLICATION

This is a continuation-in-part of Ser. No. 195,827, filed Oct. 10, 1980.

BACKGROUND OF THE INVENTION

1. Field of the Invention

This invention relates to an improvement in the synthesis of hydrogen peroxide from hydrogen and oxygen and, more particularly, to a process in which improved yields of hydrogen peroxide are attained along with an unexpected increase in catalyst life.

2. Prior Art

The synthesis of hydrogen peroxide from hydrogen and oxygen in aqueous systems containing an oxygen-containing organic cosolvent and an aqueous acid or acids, in the presence of a Group VIII metal catalyst on a support, has been proposed by Hooper in U.S. Pat. Nos. 3,361,533 and 3,336,112. These references disclose using hydrogen and oxygen at ratios close to 1:1, as required by stoichiometry:

$$H_2 + O_2 \rightarrow H_2O_2$$

It has been proposed by Kim et al., in U.S. Pat No. 4,007,256, that a solvent system containing an organic nitrogen compound, a strong acid and water can be used for the synthesis of hydrogen peroxide in the presence of a palladium catalyst on a solid support. In data derived from batch studies in acetonitrile:water 85:15, varying the hydrogen/oxygen ratio from 2:1 to 1:0.33, improvement in both hydrogen peroxide yield and in selectivity to hydrogen peroxide was found at lower hydrogen/oxygen ratios.

Izumi (U.S. Pat. No. 4,009,252) has proposed preparing hydrogen peroxide in an essentially aqueous medium, using a platinum-group catalyst while maintaining partial pressures of hydrogen and oxygen of at least 0.5 and 1.0 atmospheres, respectively. It is preferred that the oxygen/hydrogen ratio be 2.0–10. The reference states that the amount of catalyst per volume of solution should not exceed 30 mg., calculated as metal, per 100 ml. of aqueous medium. Preferably, the amount of catalyst is 0.1–20 mg., as metal, per 100 ml. of solution. Moreover, in order to avoid danger of explosion at high pressures of hydrogen and oxygen, the use of an inert diluent gas is recommended. This process is economically not practical due to the low solubility of hydrogen in water, particularly at low hydrogen partial pressures and the low levels of catalyst charge ($<30$ mg./100 cc.) indicated as being tolerable. British Pat. No. 1,490,925 proposes a similar process for synthesizing hydrogen peroxide.

In British Pat. No. 1,546,129, an improved method for synthesizing hydrogen peroxide, under generally similar conditions, is proposed. A continuous reaction, in which the gas and liquid zones of the reactor were constantly stirred, was described. However, the catalyst must be pretreated with hydrogen before exposure to the reaction medium. This process accordingly becomes operationally very complex on a commercial scale.

The instant invention overcomes the limitations of prior art processes in a simple manner while also greatly extending the useful catalyst life, a problem with all the above processes.

SUMMARY OF THE INVENTION

In accordance with this invention, there is provided an improved process for the synthesis of hydrogen peroxide from hydrogen and oxygen, in the presence of a Group VIII metal catalyst deposited on a solid support, in an acidic medium containing an oxygenated or nitrogenous organic compound, wherein the ratio of catalyst is above about 3.4 and the amount of Group VIII noble metal catalyst is above 30 mg. per 100 ml. of medium.

DETAILED DESCRIPTION

Figure 1:
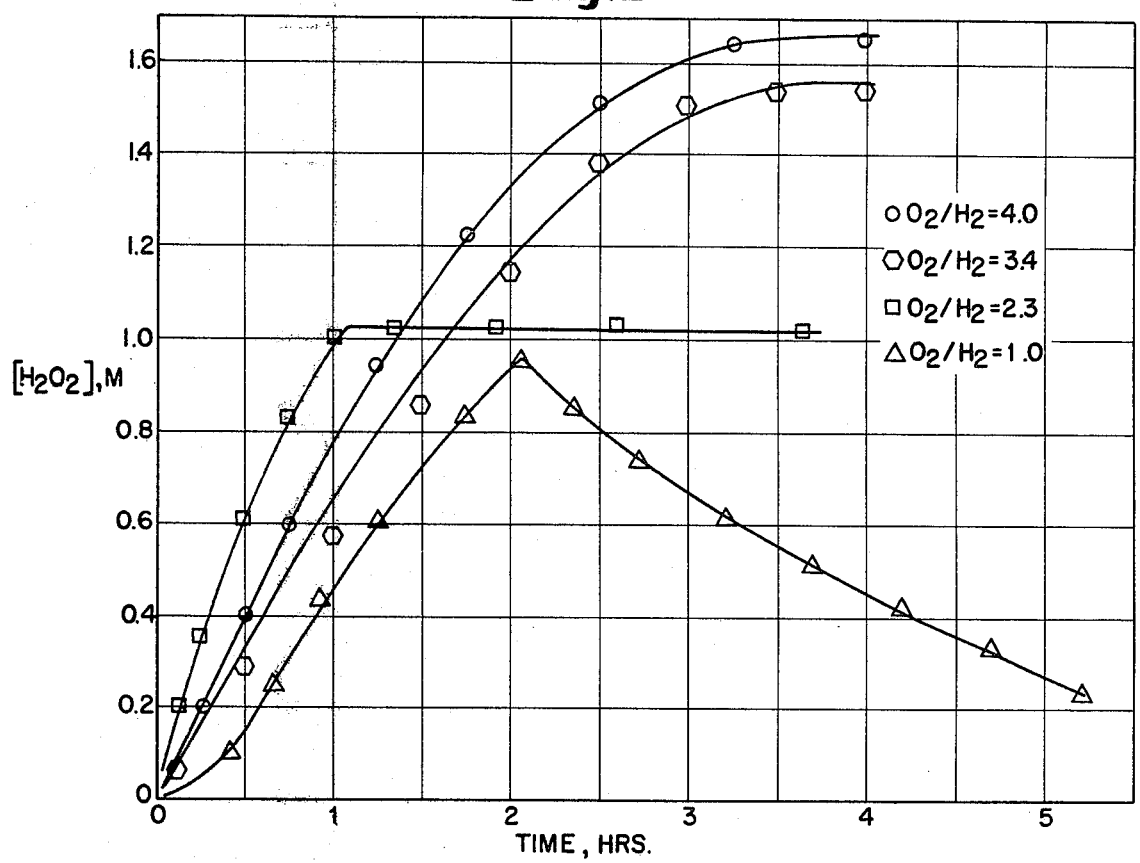
In FIG. 1 are shown the amounts of hydrogen peroxide accumulated, as a function of time, during synthesis from hydrogen and oxygen at varying oxygen/hydrogen ratios.

Group VIII noble metal catalysts include metals of the platinum and palladium subgroups of the Periodic Chart. Catalysts of the palladium subgroup, which includes palladium, ruthenium and rhodium, are preferred. Palladium is most preferred.

The Group VIII noble metal is supported on an inert support or carrier, for example silica, alumina, silicaalumina, titanium dioxide, graphite or silicon carbide. Carbon is preferred as the support.

The acidic medium used for the synthesis of hydrogen peroxide will contain an acid as defined in Hooper '533, supra. Preferably the medium will contain both sulfuric and hydrochloric acids.

The medium can contain an oxygenated organic material in accordance with Hooper, supra, or a nitrogenous cosolvent as disclosed by Kim et al., supra. Solvent systems which are particularly preferred for the purposes of this invention include aqueous acetone, particularly media containing above 75% by volume of acetone, and methanol. The most preferred methanolic media will be essentially anhydrous. However, methanol containing up to about 25% by volume of water can be used in the process of this invention.

The media used in the process of this will preferably contain a sequestrative stabilizer for hydrogen peroxide, as defined by Hooper '112, supra. A combination of sodium meta- and pyrophosphates is particularly preferred.

When the process of this invention is being carried out in a methanolic medium, formaldehyde can be added, up to about 1% by weight, to further stabilize the hydrogen peroxide produced.

In batch experiments, it has been found that use of oxygen and hydrogen at the stoichiometric ratio (1:1), at a catalyst level above 30 mg. per 100 ml. of 75:25 acetone:water, results in a maximum yield of hydrogen peroxide after about 2 hours, whereupon the concentration of hydrogen peroxide in the medium decreases as the reaction time increases. These results are consistent with catalyst deactivation. Increasing the oxygen/hydrogen ratio to 2.3 resulted in higher concentrations of hydrogen peroxide during the early stages of the run. After about an hour, hydrogen peroxide concentration remained essentially constant. Increasing hydrogen-/oxygen ratios to 3.4 and 4.0 increased the concentration of hydrogen peroxide as a function of time.

It was also found that, even at catalyst loadings in excess of the 30 mg. per 100 ml. of medium as recommended as an upper limit by Izumi et al., supra, the reaction results at an oxygen/hydrogen ratio of 3.5 were essentially insensitive to pressure, in the absence of mass transfer limitations.

The results obtained in the batch runs, at ratios of oxygen/hydrogen greater than stoichiometric were unexpected because:

(1) The reaction of hydrogen and oxygen in a liquid medium is limited by the relative solubility of hydrogen and oxygen. Hydrogen is considerably less soluble in aqueous and organic media than oxygen. To achieve the desired concentration of hydrogen in the liquid medium relative to oxygen, it would be expected that the process should be operated at oxygen/hydrogen ratios less than 1 in order to maintain a higher relative partial pressure of hydrogen.

(2) Excess oxygen would promote oxidative solubilization of the palladium catalyst.

It was further found that the effect was even more pronounced when the process of the invention was carried out continuously, preferably in a fixed bed reactor having one of the following configurations:

(1) Continuous cocurrent upward flow reactor comprising a vertical reactor packed with catalyst, provided for means for percolating hydrogen, oxygen and acidic reaction medium upwardly through the catalyst bed, venting means for gases and means at the top of the reactor for removing liquid product.

(2) Continuous countercurrent reactor comprising a vertical reactor packed with catalyst, means for introducing gas upwardly through the catalyst bed, means for passing acidic liquid downwardly through the catalyst bed, means at the bottom of the reactor for removing liquid product containing hydrogen peroxide and means at the top of the reactor for venting gases.

(3) Continuous cocurrent downflow reactor comprising a vertical reactor packed with catalyst, means for percolating acidic liquid, hydrogen and oxygen downwardly through the catalyst bed and means at the bottom of the reactor for removing gases and liquid product containing hydrogen peroxide.

(4) Continuous cross-flow reactor comprising a vertical reactor packed with catalyst, means for passing hydrogen and oxygen upwardly through the catalyst and means at the top of the reactor for venting gases, and means for passing acidic liquid medium horizontally across the catalyst bed and means for removing liquid product.

Of the reactor configurations described, a continuous reactor employing a packed bed of catalyst and providing for cocurrent upward flow of acidic liquid, hydrogen and oxygen and for venting of gases and removal of liquid product from the top of the reactor, is preferred.

Using a continuous reactor equipped for cocurrent upward flow of hydrogen, oxygen and acidic medium, it was found that reducing the hydrogen feed and simultaneously increasing the oxygen feed in aqueous acetone to an oxygen/hydrogen ratio of 8.2 increased the concentration of hydrogen peroxide in the effluent.

Similar results were obtained in essentially anhydrous methanol and in aqueous methanol. It was also found that the oxygen/hydrogen ratio can be increased by using air or oxygen-enriched air as the source of oxygen.

Experiments in a packed bed reactor also showed that the liquid flow rate through the catalyst bed can be increased with a corresponding increase in hydrogen peroxide yield, but without loss of reaction selectivity. Selectivity is:

$$100\% \times \frac{\text{moles/hr } H_2O_2 \text{ leaving reactor}}{\text{moles/hr } H_2 \text{ consumed}}$$

It appears that the liquid flow can be at any rate below that at which the bed would begin to fluidized, even at very high loadings of catalyst.

It is preferred to carry out the process of this invention at oxygen/hydrogen ratios above 5. An oxygen/hydrogen ratio of 12–15 is generally preferred.

A further advantage of the present invention is that even in the presence of a large excess of catalyst (>>30 mg./100 cc.), the reaction can be carried out at high selectivity using oxygen/hydrogen ratios of 23–40, which are outside the limits of flammability. This prevents an explosion hazard without requiring an inert diluent gas and is a significant advantage over prior art processes in commercial scale packed bed reactors. A highly selective (87%) reaction having an advantageous rate of 1.07 moles hydrogen peroxide/l.-hr-atm. hydrogen, which is mass transfer limited, has been realized under continuous reaction conditions using high gas flow (3.92 scfh for hydrogen and 117.41 scfh for oxygen) in a methanolic medium.

In a most preferred embodiment of this invention, the catalyst is packed in a fixed bed reactor and hydrogen, oxygen and acidic solvent are flowed cocurrently through the fixed bed of catalyst; the Group VIII noble metal catalyst is palladium supported on carbon; the acidic medium is methanol or aqueous acetone or methanol containing a sequestrative stabilizer for hydrogen peroxide and the oxygen/hydrogen ratio is greater than 5.

Without further elaboration, it is believed that one skilled in the art can, using the preceding description, utilize the present invention to its fullest extent. The following specific embodiments are, therefore, to be construed as merely illustrative and not limitative of the remainder of the disclosure in any way whatsoever. In the following Examples, the temperatures are set forth uncorrected in degrees Celsius. Unless otherwise indicated, all parts and percentages are by weight.

EXAMPLE 1

Two grams of 5% palladium on carbon were charged to a stirred reactor containing 275 cc. of 75% acetone—25% water by volume which was 0.1 N in sulfuric acid and 0.01 N in hydrochloric acid, and contained 100 ppm of each of sodium meta- and pyrophosphates. After cooling to 0° C., hydrogen and oxygen were sparged at rates of 0.6 scfh and 2.05 scfh, respectively, an oxygen/hydrogen ratio of 3.4, through the solvent containing suspended catalyst. The pressure was 125 psig. The concentration of hydrogen peroxide accumulated was determined as a function of time by titration with standardized potassium permanganate solution.

Results for this run are shown in FIG. 1 by the line connecting the ⊙.

In the same fashion, experiments were done at representative oxygen/hydrogen ratios. The results are shown on FIG. 1 as follows:

| $O_2/H_2$ | Symbol |
|---|---|
| 4.0 | ⊙ |
| 2.3 | □ |
| 1.0 | △ |

These results show that increasing oxygen/hydrogen ratios above unity, particularly about or above 3.4, results in an increase in the amount of hydrogen peroxide obtained at comparable times.

EXAMPLE 2

Figure 2:
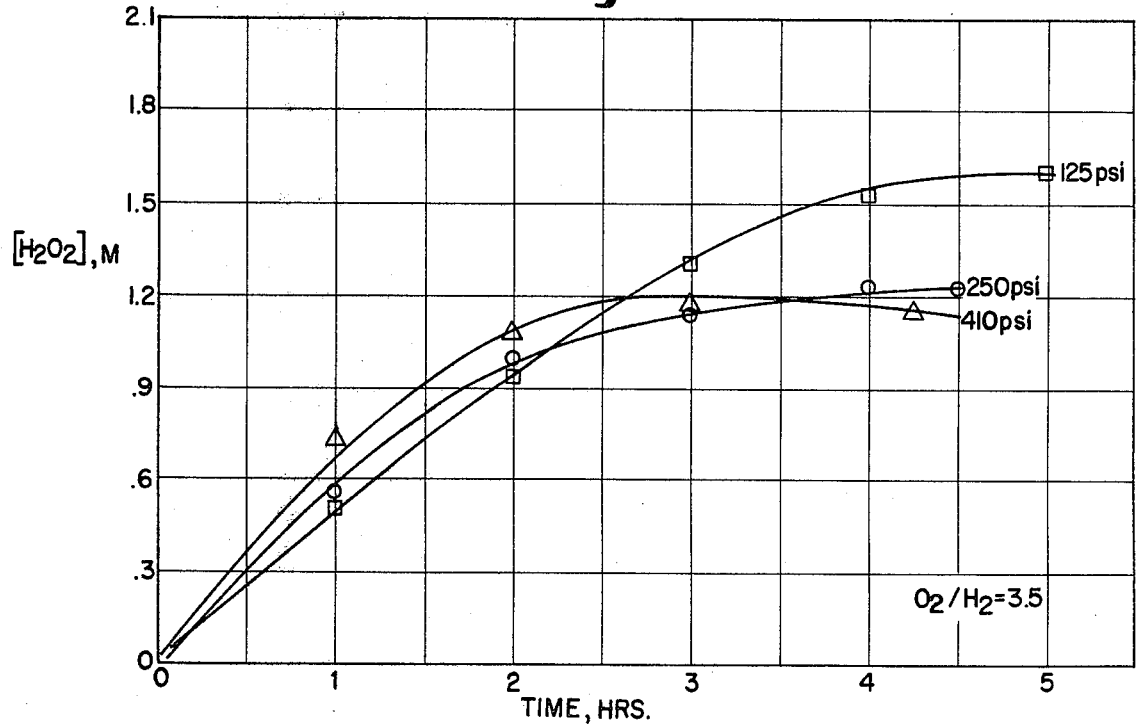
In FIG. 2 are shown the amounts of hydrogen peroxide accumulated, as a function of time, from hydrogen and oxygen an an oxygen/hydrogen ratio of 3.5 and various total pressures.

The effect of gas pressure was studied in experiments, otherwise as in Example 1, at an oxygen/hydrogen ratio of 3.5 and varying pressures. Results are shown in FIG. 2, wherein □ represents total pressure of 125 psi, ⊙ represents total pressure of 250 psi and △ represents total pressure of 410 psi.

These results show that, in the absence of mass transfer limitations, the production of hydrogen peroxide from hydrogen and oxygen, at oxygen/hydrogen ratios above unity, is generally insensitive to pressure. These experiments also show that catalyst loadings higher than 30 mg. of palladium in 100 ml. of solvent can be used successfully.

EXAMPLE 3

A continuous reactor for the preparation of hydrogen peroxide from hydrogen and oxygen consisted of a vertical tube packed with palladium on carbon catalyst and equipped for upward cocurrent inflow of hydrogen, oxygen and solvent. Each of the inflow systems was equipped with metering means and a source of hydrogen, oxygen and solvent. The reactor was a pipe 5 feet in length and 1.28 inches in inner diameter lined with polytetrafluoroethylene and jacketed to permit circulation of a cooling medium. At the top of the reactor, which was equipped with a blow-out disc, was a device for removal of liquid samples, means for transferring the reactor effluent to a liquid-gas separator and means for introducing a diluent stream of nitrogen. The gas separated in the liquid-gas separator was vented and the liquid effluent retained. Analysis for hydrogen peroxide was done as in Example 1.

In Run A, the reactor contained 160 g. of 0.2% blank carbon. The solvent was 80:20 acetone:water by volume and was 0.025 N in sulfuric acid and 0.0013 N in hydrochloric acid and contained 100 ppm of each of sodium meta- and pyrophosphates.

Results, shown in Table I, indicate that reduction of hydrogen feed to the reactor with increase in the oxygen feed, going from an oxygen/hydrogen ratio of 2.9 to 8.2, increased the concentration of hydrogen peroxide in the effluent and/or selectivity.

In Run B, the results of which are also shown in Table I, the reactor was packed with 485 g. of 0.2% palladium on carbon. The solvent was methanol 0.025 N in sulfuric acid and 0.0013 N in hydrochloric acid and containing 100 ppm of each of sodium meta- and pyrophosphates.

This run showed that, even when using very high amounts of catalyst in the reactor, increasing the ratio of oxygen to hydrogen improved the selectivity toward hydrogen peroxide. These results also show that the process of this invention is feasible using air as a source of oxygen.

In Run C, the reactor was packed with 240 g. of 0.5% palladium on carbon mixed 50:50 with blank carbon. The solvent was methanol containing 0.1% of formaldehyde and 100 ppm of each of sodium meta- and pyrophosphates and which was 0.025 N in sulfuric acid and 0.0013 N in hydrochloric acid.

The results of this run show that oxygen-enriched air can be used, even at high oxygen/hydrogen ratios, to increase the hydrogen peroxide selectivity or to provide a nonflammable hydrogen-containing mixture.

In Run D, the reactor was packed with 492 g. of 0.2% palladium on carbon. The solvent was 80:20 methanol:water (by volume), containing 0.2% of formaldehyde and 100 ppm of each of sodium meta- and pyrophosphates, which was 0.025 N in sulfuric acid and 0.0013 N in hydrochloric acid.

This run indicates that decreasing solvent flow results in a decrease in peroxide selectivity.

In Run E, the reactor was packed with 485 g. of 0.2% palladium on carbon. The solvent was methanol containing 0.1% of formaldehyde and 100 ppm of each of sodium meta- and pyrophosphates and which was 0.025 N in sulfuric acid and 0.0013 N in hydrochloric acid. Increasing the flow rate of solvent increases the reaction selectivity.

In Run F, the solvent was methanol containing 0.1% of formaldehyde and 100 ppm of each of sodium meta- and pyrophosphates and was 0.025 N in sulfuric acid and 0.0013 N in hydrochloric acid. The reactor was packed with 480 g. of 1% palladium on carbon. Even in the presence of an extremely large excess of catalyst, operation at high oxygen/hydrogen ratios gave high yields of hydrogen peroxide. Further increases in solvent flow rate did not decrease the peroxide yield.

TABLE I

| Run | P, psig | T, °C. | Gas Flow | | | Solvent Flow, L/hr | Time, Hrs | $H_2O_2$ M | Selectivity |
|---|---|---|---|---|---|---|---|---|---|
| | | | $H_2$ SCFH | $O_2$ SCFH | $O_2/H_2$ | | | | |
| A | 150 | 27 | 1.83 | 5.24 | 2.9 | 0.92 | 6.2 | 0.28 | 33 |
| | | | 0.97 | 7.95 | 8.2 | 0.92 | 16.5 | 0.31 | 49 |
| B | 300 | 0 | 2.37 | 7.00 (33.3 scfh as air) | 3.0 | 1.60 | 20.0 | 0.19 | 47 |
| | | | 2.03 | 7.23 | 3.6 | " | 61.0 | 0.14 | 26 |
| | | | 2.16 | 30.9 | 14.3 | " | 91.0 | 0.28 | 51 |
| C | 400 | 0 | 1.46 | 7.6 (35.8 as air) | 5.2 | 1.70 | 16.0 | 0.21 | 85 |
| | | | | 15.3 (41% $O_2$ in $N_2$) | 10.4 | " | 29.0 | 0.25 | 89 |

TABLE I-continued

| Run | P, psig | T, °C | Gas Flow H₂ SCFH | Gas Flow O₂ SCFH | O₂/H₂ | Solvent Flow, L/hr | Time, Hrs | H₂O₂ M | Selectivity |
|---|---|---|---|---|---|---|---|---|---|
|  |  |  | 1.53 | 22.1 (62% O₂ in N₂) | 14.5 | " | 40.0 | 0.25 | 90 |
|  |  |  | 1.50 | 35.9 | 24.0 | " | 51.0 | 0.34 | 99 |
| D | 150 | 13 | 2.09 | 30.9 | 14.8 | 1.55 | 16 | 0.22 | 73 |
|  |  |  |  |  |  | 0.72 | 22 | 0.31 | 56 |
| E | 300 | 0 | 2.39 | 36.0 | 15.0 | 1.70 | 9 | 0.41 | 56 |
|  |  |  |  |  |  | 2.40 | 24 | 0.26 | 63 |
| F | 400 | 0 | 3.54 | 97.4 | 27.5 | 2.50 | 13 | 0.49 | 65 |
|  |  |  |  |  |  | 4.00 | 28 | 0.30 | 76 |

EXAMPLE 4

The reactor described in Example 3 was charged with 500 g. of 2% palladium on carbon catalyst. The solvent employed was methanol containing 0.1% by weight of formaldehyde, 100 ppm of each of sodium meta- and pyrophosphates and which was 0.025 N in sulfuric acid and 0.0013 N in hydrochloric acid. The temperature was 0° C. and the pressure 400 psig. The oxygen/hydrogen ratios were 23-30, which are outside the limits of flammability or explosion. Flow rates of hydrogen/oxygen and of solvent were increased incrementally, with the following results:

| Elapsed Time, Hrs | H₂ Flow, scfh | O₂ Flow, scfh | Solvent Flow, L/hr | H₂O₂ Conc., M | Selectivity, % |
|---|---|---|---|---|---|
| 13.5 | 1.52 | 35.46 | 1.7 | 0.41 | 74 |
| 33.5 | 3.31 | 91.78 | 1.7 | 0.70 | 66 |
| 58.5 | 3.31 | 91.78 | 1.7 | 0.67 | 65 |
| 67.5 | 3.31 | 91.78 | 2.6 | 0.49 | 98 |
| 73.5 | 3.31 | 91.78 | 2.6 | 0.43 | 95 |
| 84.5 | 3.92 | 117.41 | 2.5 | 0.42 | 65 |
| 93.5 | 3.92 | 117.41 | 3.5 | 0.31 | 87 |

EXAMPLE 5

The reactor described in Example 3 was packed with 200 gms of 0.2% palladium on carbon catalyst. A solvent consisting of 80% acetone—20% water, which was 0.1 N in sulfuric acid and 0.01 N in hydrochloric acid and contained 100 ppm of each of sodium and meta- and pyrophosphates, was passed up through the catalyst bed at the rate of 0.883 L/hr (1.6 LHSV). Hydrogen and oxygen were introduced at 1.61 and 4.61 scfh, respectively (2.86 ratio). The pressure was 150 psig and the temperature 27° C. After 4 hours, the hydrogen peroxide concentration in the effluent was 0.57 molar, which corresponds to a rate of accumulation of peroxide of 1.2 moles hydrogen peroxide/gm palladium/hr at 40% selectivity. After 100 hours, 9400 moles hydrogen peroxide had been produced per mole of palladium and the catalyst had lost 30% of its initial activity.

This experiment shows that use of low oxygen/hydrogen ratios results in low selectivity and suggests that the catalyst deactivation rate, although improved over batch operations, is still a problem in extended runs.

What is claimed is:

1. In a process for the synthesis of hydrogen peroxide from hydrogen and oxygen, in the presence of a Group VIII noble metal catalyst deposited on a solid support, in an acidic medium containing an oxygenated organic compound or a nitrogenous organic compound, the improvement wherein the partial pressure or molar ratio ratio of oxygen to hydrogen is greater than about 3.4 and the amount of Group VIII noble metal catalyst is more than 30 mg. per 100 ml. of medium.

2. The process of claim 1, wherein the Group VIII noble metal is palladium supported on carbon.

3. The process of claim 1, wherein the acidic medium contains aqueous acetone.

4. The process of claim 1, wherein the acidic medium contains methanol.

5. The process of claim 1, wherein the oxygen/hydrogen ratio is greater than 5.

6. The process of claim 1, wherein the oxygen/hydrogen ratio is 12-15.

7. The process of claim 1, wherein the catalyst is packed in a fixed bed reactor and hydrogen, oxygen and acidic medium are flowed cocurrently through the fixed bed of catalyst.

8. The process of claim 1, wherein the Group VIII noble metal is palladium supported on carbon, the acidic medium contains aqueous acetone containing a sequestrative stabilizer for hydrogen peroxide, the oxygen/hydrogen ratio is greater than 5 and the catalyst is packed in a fixed bed reactor and hydrogen, oxygen and acidic medium are flowed cocurrently through the fixed bed of catalyst.

9. The process of claim 1, wherein the Group VIII noble metal is palladium supported on carbon, the acidic medium contains methanol containing a sequestrative stabilizer for hydrogen peroxide, the oxygen/hydrogen ratio is greater than 5 and the catalyst is packed in a fixed bed reactor and hydrogen and acidic medium are flowed cocurrently through the fixed bed of catalyst.

10. The process of claim 1, wherein oxygen is provided from air or oxygen-enriched air.

11. The process of claim 1, wherein the amount of Group VIII noble metal catalyst is more than about 35 mg. per 100 ml. of medium.

12. The process of claim 1, carried out as a continuous process employing a fixed bed of catalyst.

* * * * *